US012638324B2

(12) United States Patent
Bonnefoi et al.

(10) Patent No.: US 12,638,324 B2
(45) Date of Patent: May 26, 2026

(54) REFRIGERANT COMPRESSOR INCLUDING AN OIL LEVEL SENSOR ARRANGEMENT

(71) Applicant: Danfoss Commercial Compressors, Trevoux (FR)

(72) Inventors: Patrice Bonnefoi, Nordborg (DK); Gabriel Streda, Nordborg (DK); Yves Rosson, Nordborg (DK); Jean-Jacques Laissus, Nordborg (DK); Alexis Delorme, Nordborg (DK)

(73) Assignee: DANFOSS COMMERCIAL COMPRESSORS, Trevoux (FR)

( * ) Notice: Subject to any disclaimer, the term of this patent is extended or adjusted under 35 U.S.C. 154(b) by 267 days.

(21) Appl. No.: 17/840,944

(22) Filed: Jun. 15, 2022

(65) Prior Publication Data

US 2022/0412359 A1 Dec. 29, 2022

(30) Foreign Application Priority Data

Jun. 23, 2021 (FR) ..................................... 21/06712

(51) Int. Cl.
| | |
|---|---|
| *F04C 29/02* | (2006.01) |
| *F04B 49/02* | (2006.01) |
| *F04B 53/18* | (2006.01) |
| *F04C 18/02* | (2006.01) |

(Continued)

(52) U.S. Cl.
CPC .............. *G01F 23/56* (2013.01); *F04B 49/02* (2013.01); *F04B 53/18* (2013.01); *F04C 29/021* (2013.01); *G01F 23/62* (2013.01)

(58) Field of Classification Search
CPC ........ F04B 49/02; F04B 53/18; F04C 29/021; G01F 23/56; G01F 23/62
See application file for complete search history.

(56) References Cited

U.S. PATENT DOCUMENTS

| | | | | |
|---|---|---|---|---|
| 4,709,143 A | * | 11/1987 | Henderson ............... | G01V 8/20 |
| | | | | 250/577 |
| 5,562,003 A | * | 10/1996 | Lefebvre ................. | G01F 23/74 |
| | | | | 73/314 |
| 5,687,687 A | | 11/1997 | Trueblood et al. | |

(Continued)

FOREIGN PATENT DOCUMENTS

| | | |
|---|---|---|
| CA | 2225112 A1 | 6/1998 |
| CN | 102695834 A | 9/2012 |

(Continued)

*Primary Examiner* — Connor J Tremarche
(74) *Attorney, Agent, or Firm* — McCormick, Paulding & Huber PLLC

(57) ABSTRACT

The refrigerant compressor includes a compressor casing (2); an oil sump (13) arranged in the compressor casing (2); and an oil level sensor arrangement (14) configured to detect an oil level in the oil sump (13), the oil level sensor arrangement (14) including a tubular element (16) secured to the compressor casing (2) and a floating element (17) surrounding the tubular element (16) and being movably mounted with respect to the tubular element (16). The compressor casing (2) includes a passage opening (24) and dimensions of the tubular element (16), the floating element (17) and the passage opening (24) are defined to allow an insertion and a removal of the tubular element (16) and the floating element (17) into and out of the compressor casing (2) through the passage opening (24).

19 Claims, 5 Drawing Sheets

(51) Int. Cl.
　G01F 23/56　　　(2006.01)
　G01F 23/62　　　(2006.01)

(56)　　　　　　References Cited

U.S. PATENT DOCUMENTS

| 5,699,049 | A | * | 12/1997 | Difiore | G01F 23/36 |
| | | | | | 73/290 R |
| 5,921,283 | A | | 7/1999 | Alvern | |
| 6,276,901 | B1 | | 8/2001 | Farr et al. | |
| 6,462,666 | B1 | * | 10/2002 | Einck | F04D 15/0218 |
| | | | | | 361/752 |
| 8,708,959 | B2 | * | 4/2014 | Haase | A61M 5/14276 |
| | | | | | 604/93.01 |
| 2006/0096639 | A1 | * | 5/2006 | Coogle | F24F 13/222 |
| | | | | | 137/268 |
| 2007/0081902 | A1 | * | 4/2007 | Zhang | F04B 49/022 |
| | | | | | 417/32 |
| 2012/0116695 | A1 | * | 5/2012 | Young | G01F 23/74 |
| | | | | | 702/55 |
| 2016/0187173 | A1 | * | 6/2016 | Jang | F01M 11/12 |
| | | | | | 73/304 C |

FOREIGN PATENT DOCUMENTS

| CN | 105067088 | A | 11/2015 |
| CN | 204831468 | U | 12/2015 |
| CN | 105865584 | A | 8/2016 |
| CN | 107667224 | A | 2/2018 |
| CN | 110439783 | A | 11/2019 |
| CN | 212867870 | U | 4/2021 |
| EP | 1963623 | B1 | 9/2008 |
| JP | 08247826 | A | 9/1996 |
| JP | 2011158218 | A | 8/2011 |
| WO | 2017098346 | A1 | 6/2017 |
| WO | 2022069147 | A1 | 4/2022 |

* cited by examiner

[Fig 1]

[Fig 2]
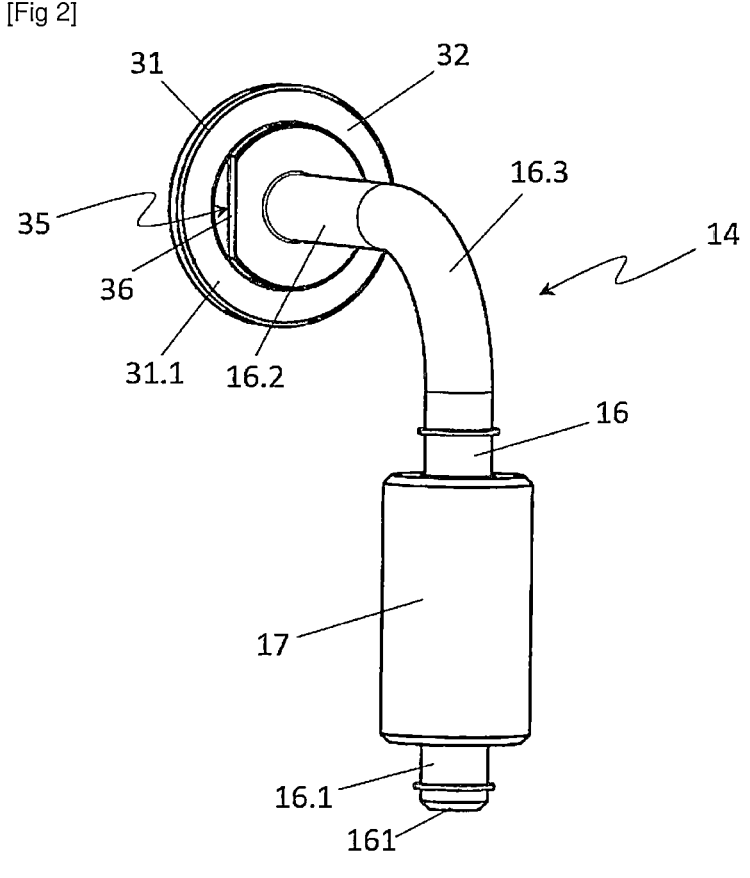
[Fig 3]
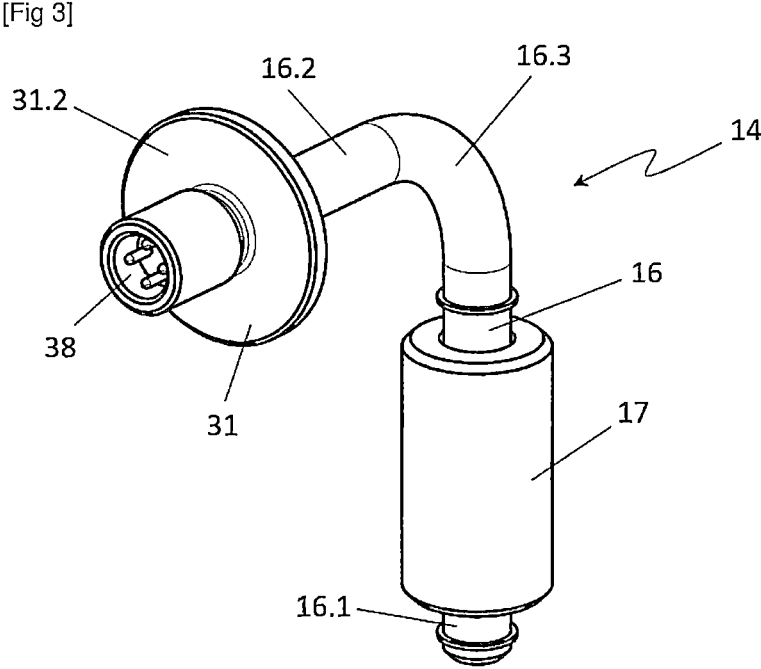

[Fig 4]
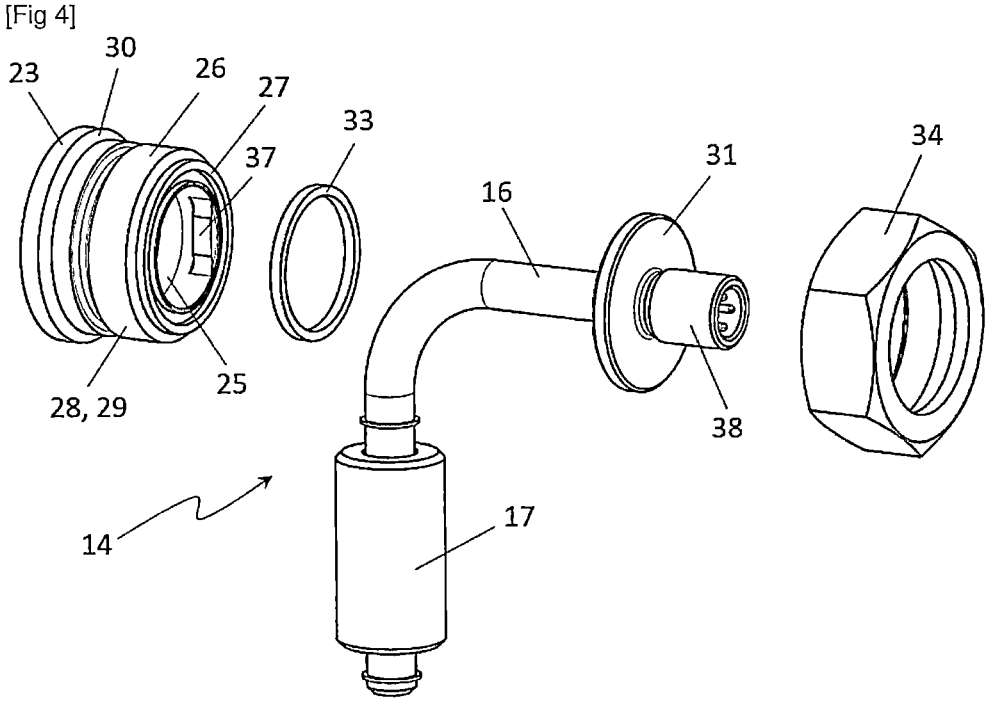
[Fig 5]
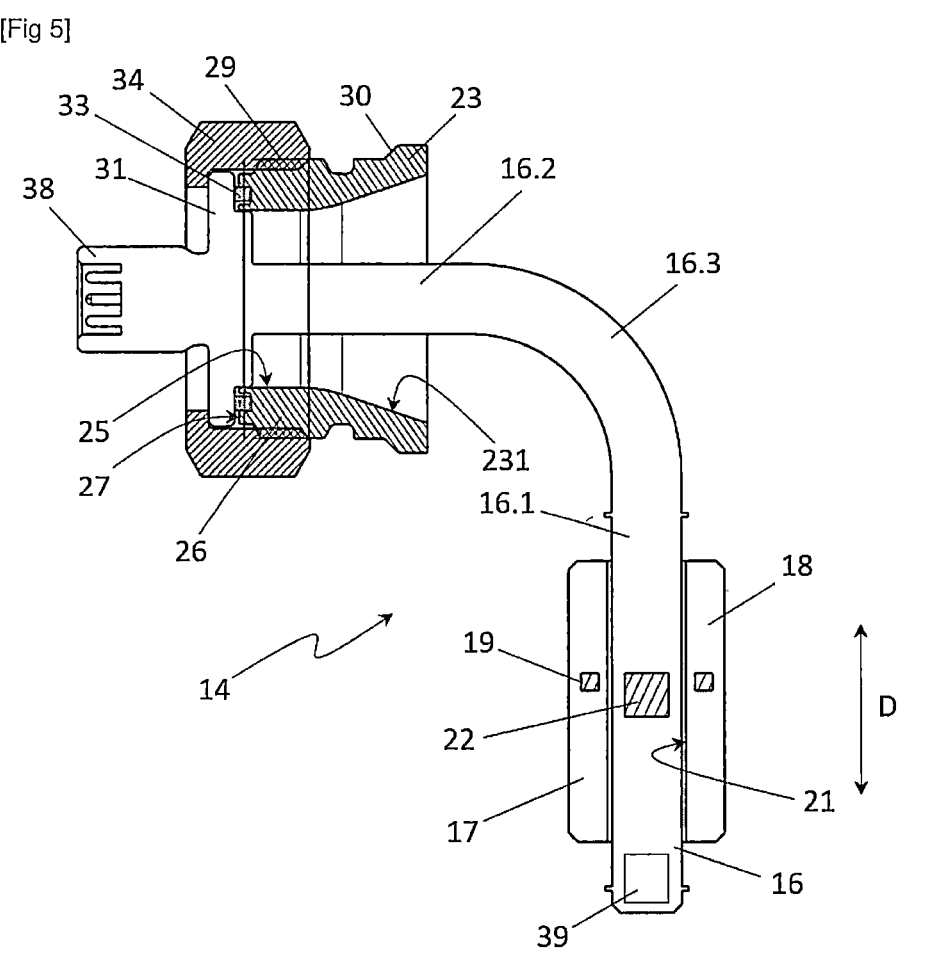

[Fig 6]
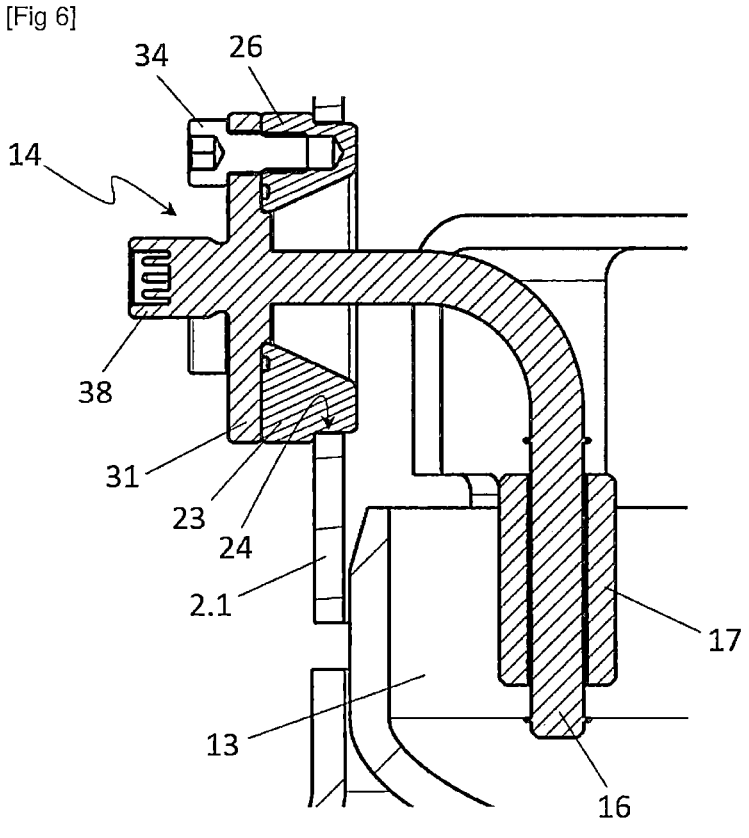
[Fig 7]
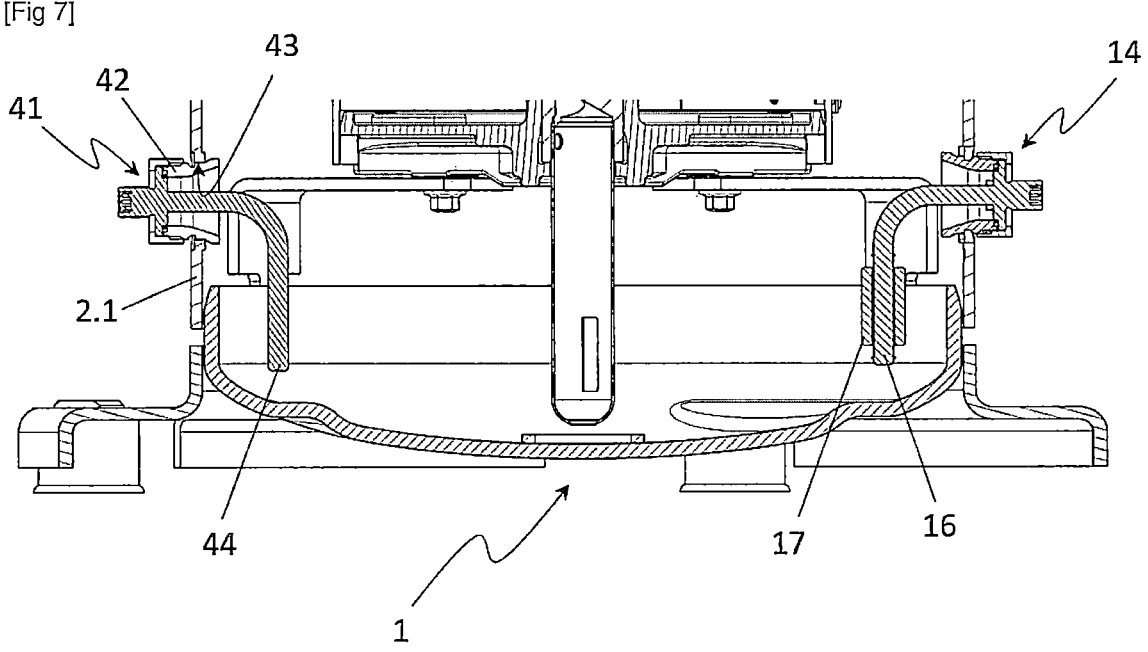

[Fig 8]
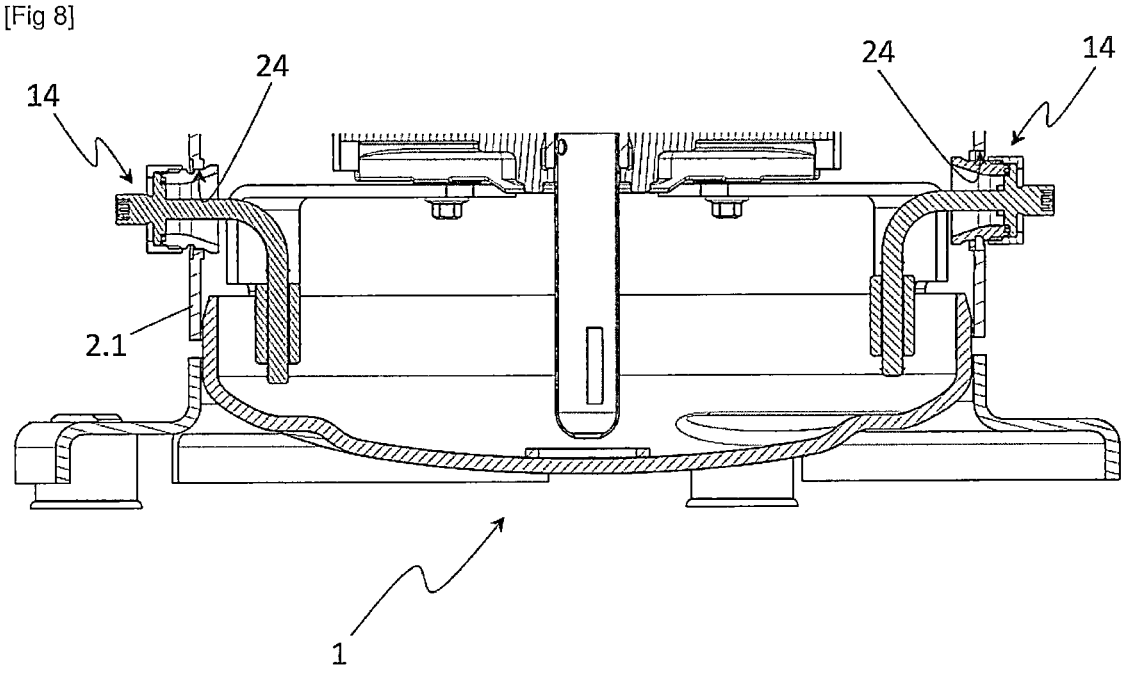

REFRIGERANT COMPRESSOR INCLUDING AN OIL LEVEL SENSOR ARRANGEMENT

CROSS-REFERENCE TO RELATED APPLICATION

This application claims foreign priority benefits under U.S.C. § 119 from French Patent Application No. 21/06712, filed Jun. 23, 2021, the content of which is hereby incorporated by reference in its entirety.

TECHNICAL FIELD

The invention relates to a refrigerant compressor, for example a hermetic scroll compressor, including an oil level sensor arrangement.

BACKGROUND

CN212867870U discloses a refrigerant compressor including a compressor casing, an oil sump arranged in a lower part of the compressor casing, and an oil level sensor arrangement positioned in the lower part of the compressor casing and configured to detect an oil level in the oil sump of the refrigerant compressor.

The oil level sensor arrangement includes a tubular element secured to a bottom surface of the compressor casing, a magnetically sensitive sensor arranged inside the tubular element, and a magnetic floating element surrounding the tubular element and being slidably mounted with respect to the tubular element along a displacement direction, the floating element being configured to float on lubricant oil contained in the oil sump. The oil level sensor arrangement further includes a feed-through, for sensor output lines connectable to a controller of the refrigerant compressor, is formed in the bottom surface of the compressor casing.

The tubular element and the magnetic floating element of such an oil level sensor arrangement are not accessible from the outside of the refrigerant compressor. Therefore, such an oil level sensor arrangement cannot be replaced in case of a failure, even though such an oil level sensor arrangement represents a relatively inexpensive component compared to the total cost of a refrigerant compressor. The risk of failure of such an oil level sensor arrangement is not negligible due to the fact that hermetic refrigerant compressors, especially larger capacity compressors, are in operation for many years.

SUMMARY

It is an object of the present invention to provide an improved refrigerant compressor, which can overcome the drawbacks encountered in conventional refrigerant compressors.

Another object of the present invention is to provide a refrigerant compressor having an improved lifetime, while limiting the manufacturing cost of the refrigerant compressor.

According to the invention such a refrigerant compressor includes:

a compressor casing, an oil sump arranged in a lower part of the compressor casing, and an oil level sensor arrangement configured to detect an oil level in the oil sump, the oil level sensor arrangement including a tubular element secured to the compressor casing and at least partially arranged inside the compressor casing, and a floating element surrounding the tubular element and being movably mounted with respect to the tubular element, the floating element being configured to float on lubricant oil contained in the oil sump, wherein the compressor casing includes a passage opening, dimensions of the tubular element, the floating element and the passage opening being defined to allow an insertion of the tubular element and the floating element into the compressor casing through the passage opening and a removal of the tubular element and the floating element out of the compressor casing through the passage opening.

Due to such configuration of the oil level sensor arrangement according to the present invention, the tubular element and the floating element can be easily removed out of the compressor casing and thus be easily replaced with a new tubular element and/or a new floating element in case of a failure of the oil level sensor arrangement. Hereby, proper function and control of the refrigerant compressor according to the present invention can be maintained during the entire lifetime of the refrigerant compressor.

The refrigerant compressor may also include one or more of the following features, taken alone or in combination.

According to an embodiment of the invention, the floating element is slidably mounted with respect to the tubular element along a displacement direction.

According to an embodiment of the invention, the refrigerant compressor includes a controller configured to control operation of the refrigerant compressor. The controller may be configured to control operation of the refrigerant compressor based on the oil level detected by the oil level sensor arrangement.

According to an embodiment of the invention, the compressor casing is provided with a suction inlet configured to supply the refrigerant compressor with refrigerant gas to be compressed and a discharge outlet configured to discharge compressed refrigerant gas.

According to an embodiment of the invention, the floating element is a magnetic floating element.

According to an embodiment of the invention, the displacement direction of the floating element extends substantially parallel to a longitudinal axis of the refrigerant compressor.

According to an embodiment of the invention, the floating element includes a floating body and a magnet element secured to the floating body.

According to an embodiment of the invention, the floating body includes a central through passage into which extends the tubular element.

According to an embodiment of the invention, the magnet element includes a plurality of permanent magnets angularly distributed around the central through passage provided on the floating body. Alternatively, the magnet element includes an annular permanent magnet disposed coaxially with the central through passage provided on the floating body.

According to an embodiment of the invention, the magnet element is at least partially arranged, and for example encapsulated, within the floating body.

According to an embodiment of the invention, the oil level sensor arrangement includes a magnetically sensitive sensor arranged inside the tubular element and configured to be activated by a magnetic field provided by the magnet element.

According to an embodiment of the invention, the magnetically sensitive sensor is a magnetically operated electrical switch, and for example a magnetic reed switch.

According to an embodiment of the invention, the magnetically sensitive sensor is a Hall sensor.

According to an embodiment of the invention, the passage opening is provided on a mid shell or on a baseplate of the compressor casing.

According to an embodiment of the invention, the compressor casing further includes an upper cap and a baseplate respectively secured to upper and lower end portions of the mid shell.

According to an embodiment of the invention, the mid shell is substantially cylindrical.

According to an embodiment of the invention, the passage opening is provided at a flat surface portion of the mid shell.

According to an embodiment of the invention, the oil level sensor arrangement further includes a support member, such as a support sleeve, secured, and for example welded, to the passage opening, the support member including an axial through passage and being configured to allow insertion and removal of the tubular element and the floating element through the axial through passage, the tubular element being attached to the support member.

According to an embodiment of the invention, the support member has a ring shape or a tubular shape.

According to an embodiment of the invention, the support member has a frustoconical inner surface which diverges towards an inner volume of the compressor casing. Such a configuration of the support member eases the introduction and removal of the tubular member and the floating element through the axial through passage.

According to an embodiment of the invention, the support member is at least partially inserted in the passage opening and is hermetically secured thereto.

According to an embodiment of the invention, the axial through passage and the passage opening are coaxially arranged with respect to each other.

According to an embodiment of the invention, the dimensions of the tubular element and the floating element are defined to allow insertion and removal of the tubular element and the floating element through the axial through passage of the support member.

According to an embodiment of the invention, the support member includes a cylindrical support portion at least partially arranged outside the compressor casing and projecting in a radial direction away from the compressor casing.

According to an embodiment of the invention, the oil level sensor arrangement includes a mounting flange secured to a proximal end portion of the tubular element, the mounting flange including a first flange face and a second flange face opposite to the first flange face, the first flange face including an annular contact surface which abuts against an end face of the cylindrical support portion. Advantageously, the end face of the cylindrical support portion and the mounting flange are arranged outside the compressor casing.

According to an embodiment of the invention, the oil level sensor arrangement further includes a sealing element arranged between the mounting flange and the cylindrical support portion.

According to an embodiment of the invention, the mounting flange includes an annular groove provided at the end face of the cylindrical support portion and accommodating the sealing element.

According to an embodiment of the invention, the mounting flange is pressed against the end face of the cylindrical support portion by a threaded fixing member cooperating with a thread provided on the cylindrical support portion and with the second flange face of the mounting flange. Said thread may be provided on an outer circumferential surface of the cylindrical support portion or on an inner surface of the threaded bore emerging in the end face of the cylindrical support portion.

According to an embodiment of the invention, the threaded fixing member includes a tubular fixing portion having an inner circumferential surface provided with an inner thread configured to cooperate with the thread provided on the outer circumferential surface of the cylindrical support portion, and an annular bearing part having an annular bearing surface configured to bear against the second flange face of the mounting flange when the threaded fixing member is screwed on the cylindrical support portion.

According to an embodiment of the invention, the threaded fixing member is a threaded nut element.

According to an embodiment of the invention, the oil level sensor arrangement includes an electrical connector formed on the second flange face of the mounting flange and configured to allow connection of signal leads and/or power supply leads for communication with a controller of the refrigerant compressor or of a refrigeration system comprising the refrigerant compressor.

According to an embodiment of the invention, the tubular element includes a distal end which is immersed in the oil sump and which is closed.

According to an embodiment of the invention, the tubular element comprises a first tubular part having a first longitudinal axis and a second tubular part having a second longitudinal axis, the first and second longitudinal axes of the first and second tubular parts being arranged at an angle of about 90 degrees.

According to an embodiment of the invention, the first tubular part is arranged vertically and is at least partly immersed in the oil sump, the first tubular part being surrounded by the floating element.

According to an embodiment of the invention, the magnetically sensitive sensor is arranged within the first tubular part.

According to an embodiment of the invention, the second tubular part is arranged horizontally. Advantageously, the second tubular part is at least partly arranged inside the support member.

According to an embodiment of the invention, the second tubular part extends at least partially through the axial through passage of the support member.

According to an embodiment of the invention, the tubular element includes an arcuate connecting part which connects the first and second tubular parts.

According to an embodiment of the invention, the oil level sensor arrangement includes an angular indexing device configured to define a predetermined relative angular position of the mounting flange with respect to the support member. Advantageously, the predetermined relative angular position of the mounting flange is defined such that the first tubular part extends vertically.

According to an embodiment of the invention, the angular indexing device includes a first flat portion provided on the mounting flange and a second flat portion provided on the support member and configured to cooperate with the first cooperating flat portion to define and maintain the predetermined relative angular position, e.g. during mounting of the threaded fixing member.

According to an embodiment of the invention, the floating body has a hollow or porous structure.

According to an embodiment of the invention, the floating body is made by a material having a density lower than a density of the lubricant oil contained in the oil sump.

According to an embodiment of the invention, the floating body is made by polymer material, such as polymethylpentene. Advantageously, the polymer material is molded around the magnet element.

According to an embodiment of the invention, the oil level sensor arrangement is configured to provide a low oil level warning signal to the controller if oil level in the oil sump reaches a predetermined low oil level.

According to an embodiment of the invention, the controller is configured to stop the refrigerant compressor, for example without or with a predetermined delay of time, if a low oil level warning signal is provided to the controller.

According to an embodiment of the invention, the controller is configured to allow continuous operation of the refrigerant compressor if oil level in the oil sump reaches a predetermined threshold oil level within the predetermined delay of time, where the predetermined threshold oil level is higher than the predetermined low oil level.

The oil level sensor arrangement may further comprise at least one additional sensor configured to detect physical properties of the oil sump and/or physical properties of the gas inside the compressor casing, such as temperature, pressure, moisture content of the lubricant oil, oil viscosity, oil quality, contaminations etc. Knowledge to such properties can be used for improved surveillance and protection of the refrigerant compressor. Particularly, the controller is also configured to control operation of the refrigerant compressor based on the physical properties detected by the at least one additional sensor.

According to an embodiment of the invention, the at least one additional sensor is arranged inside the tubular element, and particularly inside the first tubular part. Advantageously, the at least one additional sensor is a temperature sensor configured to detect oil temperature in the oil sump.

According to an embodiment of the invention, the refrigerant compressor further includes a sensor device configured to detect physical properties of the oil sump and/or physical properties of the gas inside the compressor casing, the sensor device including a mounting part secured to an additional passage opening provided on the compressor casing, and a sensing part removably secured to the mounting part and at least partially arranged inside the compressor casing, dimensions of the sensing part and the additional passage opening are defined to allow an insertion and a removal of the sensing part into and out of the compressor casing through the additional passage opening.

According to an embodiment of the invention, the refrigerant compressor is a hermetic scroll compressor.

The present invention also relates to a refrigeration system including a refrigerant compressor according to the present invention, and a system controller configured to control operation of the refrigerant compressor based on oil level detected by the oil level sensor arrangement of the refrigerant compressor.

These and other advantages will become apparent upon reading the following description in view of the drawing attached hereto representing, as non-limiting examples, embodiments of a refrigerant compressor according to the invention.

BRIEF DESCRIPTION OF THE DRAWINGS

The following detailed description of several embodiments of the invention is better understood when read in conjunction with the appended drawings being understood, however, that the invention is not limited to the specific embodiments disclosed.

FIG. 1 is a longitudinal section view of a refrigerant compressor according to a first embodiment of the invention.

FIG. 2 is a partial front perspective view of an oil level sensor arrangement of the refrigerant compressor of FIG. 1.

FIG. 3 is a partial rear perspective view of the oil level sensor arrangement of FIG. 2.

FIG. 4 is an exploded perspective view of the oil level sensor arrangement of FIG. 2.

FIG. 5 is a longitudinal section view of the oil level sensor arrangement of FIG. 2.

FIG. 6 is a partial longitudinal section view of a refrigerant compressor according to a second embodiment of the invention.

FIG. 7 is a partial longitudinal section view of a refrigerant compressor according to a third embodiment of the invention.

FIG. 8 is a partial longitudinal section view of a refrigerant compressor according to a fourth embodiment of the invention.

DETAILED DESCRIPTION

Figure 1:
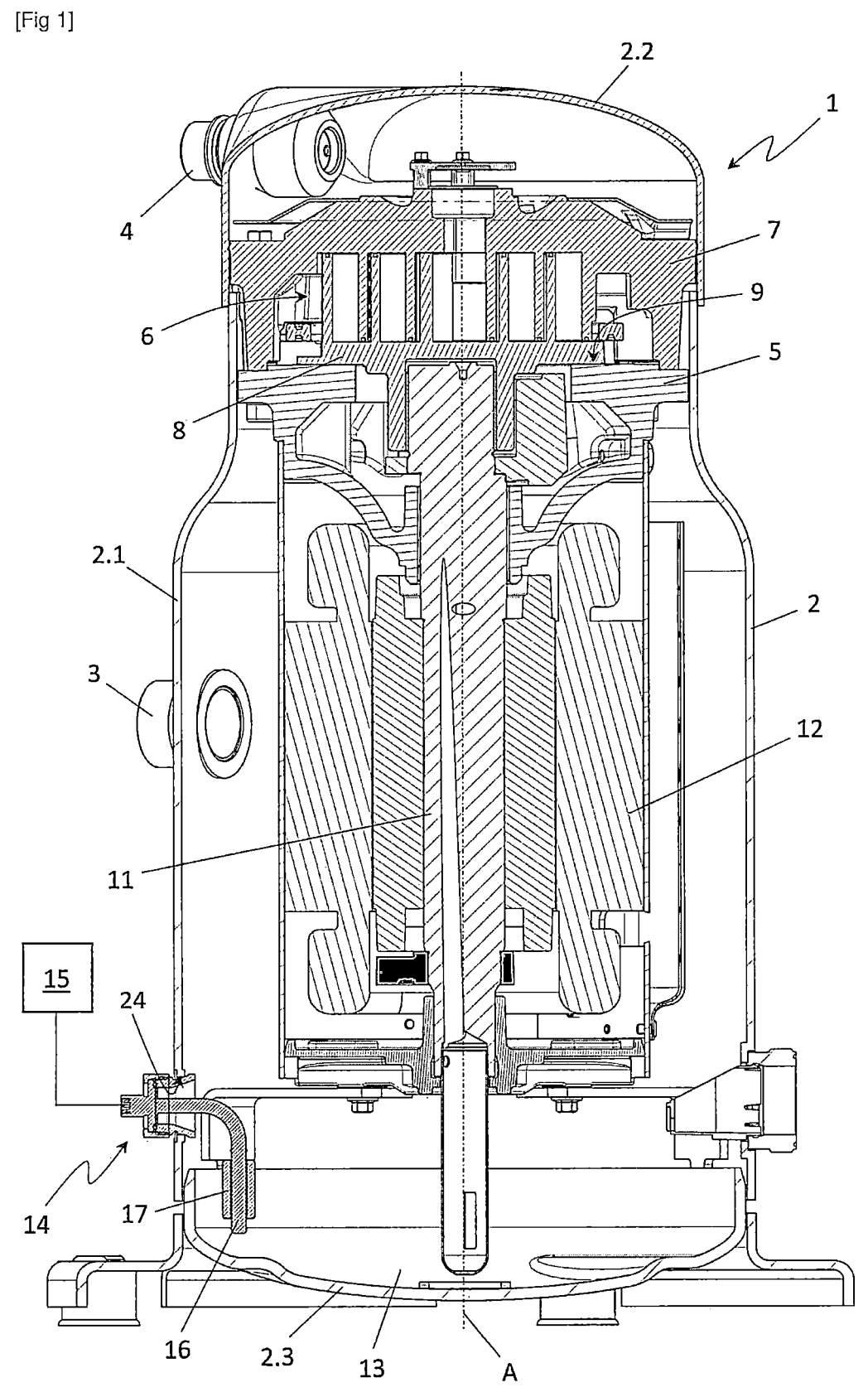

FIG. 1 describes a refrigerant compressor 1, and particularly a hermetic scroll compressor, according to a first embodiment of the invention occupying a vertical position. The refrigerant compressor 1 may also be a non hermetic scroll compressor.

The refrigerant compressor 1 includes a compressor casing 2, such as a hermetic casing, provided with a suction inlet 3 configured to supply the refrigerant compressor 1 with refrigerant to be compressed, and with a discharge outlet 4 configured to discharge compressed refrigerant. The compressor casing 2 particularly includes mid shell 2.1, which is substantially cylindrical, an upper cap 2.2 secured to an upper end portion of the mid shell 2.1, and a baseplate 2.3 secured to a lower end portion of the mid shell 2.1. Advantageously, the suction inlet 3 is provided on the mid shell 2.1 and the discharge outlet 4 is provided on the upper cap 2.2.

The refrigerant compressor 1 further includes a support arrangement 5 fixed to the compressor casing 2, and a compression unit 6 disposed inside the compressor casing 2 and supported by the support arrangement 5. The compression unit 6 is configured to compress the refrigerant supplied by the suction inlet 3. The compression unit 6 includes a fixed scroll 7, which is fixed in relation to the compressor casing 2, and an orbiting scroll 8 supported by and in slidable contact with a thrust bearing surface 9 provided on the support arrangement 5.

Furthermore, the refrigerant compressor 1 includes a drive shaft 11 which extends vertically and which is configured to drive the orbiting scroll 8 in an orbital movement, and an electric driving motor 12, which may be for example a variable-speed electric driving motor, coupled to the drive shaft 11 and configured to drive in rotation the drive shaft 11 about a rotation axis A.

The refrigerant compressor 1 also includes an oil sump 13 arranged in a lower part of the compressor casing 2, and advantageously defined by the baseplate 2.3.

The refrigerant compressor 1 further includes an oil level sensor arrangement 14 configured to detect an oil level in the oil sump 13, and a controller 15 configured to control operation of the refrigerant compressor 1 notably based on the oil level detected by the oil level sensor arrangement 14. According to the embodiment shown on FIGS. 1 to 5, the controller 15 is a compressor controller configured to control operation only of the refrigerant compressor 1. However, according to another embodiment of the invention, the controller 15 may be a system controller which belongs to a refrigeration system including the refrigerant compressor 1 and which is configured to control operation of said refrigeration system, or may be a compressor controller configured to control operation of a plurality of refrigerant compressors including the refrigerant compressor 1.

As better shown on FIGS. 2 to 5, the oil level sensor arrangement 14 includes a tubular element 16 secured to the compressor casing 2 and at least partially arranged inside the compressor casing 2, and a floating element 17 arranged inside the compressor casing 2, surrounding the tubular element 16 and being configured to float on lubricant oil contained in the oil sump 13.

According to the embodiment shown on FIGS. 1 to 5, the tubular element 16 comprises a first tubular part 16.1 having a first longitudinal axis, a second tubular part 16.2 having a second longitudinal axis and an arcuate connecting part 16.3 which connects the first tubular part 16.1 to the second tubular part 16.2. Advantageously, the first and second longitudinal axes of the first and second tubular parts 16.1, 16.2 are arranged at an angle of 90 degrees.

According to the embodiment shown on FIGS. 1 to 5, the first tubular part 16.1 is arranged vertically and is at least partly immersed in the oil sump 13, and the second tubular part 16.2 is arranged horizontally and particularly extends radially with respect to a longitudinal axis of the refrigerant compressor 1. Advantageously, the first tubular part 16.1 is surrounded by the floating element 17 and includes a distal end 161 which is immersed in the oil sump 13 and which is closed.

Advantageously, the floating element 17 is a magnetic floating element, and includes a floating body 18 and a magnet element 19 arranged, and for example encapsulated, within the floating body 18.

As better shown on FIG. 5, the floating body 18 includes a central through passage 21 into which extends the tubular element 16, and the floating body 18 is slidably mounted with respect to the tubular element 16, and particularly with respect to the first tubular part 16.1, along a displacement direction D which extends substantially parallel to a longitudinal axis of the refrigerant compressor 1. The floating body 18 may for example be tubular.

The floating body 18 may have a hollow or porous structure. Alternatively, the floating body 18 may be made by a material having a density lower than a density of the oil contained in the oil sump 13. The floating body 18 may for example be made by polymer material, such as polymethylpentene. Advantageously, the polymer material may be molded around the magnet element 19. However, according to another embodiment of the invention, the floating body 18 may be made for example in stainless steel.

The magnet element 19 may include a plurality of permanent magnets angularly distributed around the central through passage 21 provided on the floating body 18. Alternatively, the magnet element 19 may include an annular permanent magnet disposed coaxially with respect to the central through passage 21.

The oil level sensor arrangement 14 further includes a magnetically sensitive sensor 22 arranged inside the tubular element 16, and particularly inside the first tubular part 16.1, and configured to be activated by a magnetic field provided by the magnet element 19. The magnetically sensitive sensor 22 may be for example a Hall sensor or a magnetically operated electrical switch, such as a magnetic reed switch.

The oil level sensor arrangement 14 further includes a support member 23, such as a support sleeve, secured, and for example welded, to a passage opening 24 provided on the compressor casing 2 and advantageously provided on the mid shell 2.1 of the compressor casing 2. The passage opening 24 may be provided at a flat surface portion of the mid shell 2.1 and may be located at a lower end portion of the mid shell 2.1. The support member 23 has a ring shape or a tubular shape, and is at least partially inserted in the passage opening 24 and is hermetically secured thereto.

The support member 23 includes an axial through passage 25 which is coaxially arranged with respect to the passage opening 24 and through which extends the second tubular part 16.2. The dimensions of the tubular element 16 and the floating element 17 are defined to allow insertion and removal of the tubular element 16 and the floating element 17 through the passage opening 24 and through the axial through passage 25 of the support member 23. Advantageously, the support member 23 has a frustoconical inner surface 231 which diverges towards an inner volume of the compressor casing 2.

The support member 23 also includes a cylindrical support portion 26 arranged outside the compressor casing 2 and projecting in a radial direction away from the compressor casing 2. The cylindrical support portion 26 includes an end face 27 arranged outside the compressor casing 2, and an outer circumferential surface 28 provided with a thread 29. Advantageously, the cylindrical support portion 26 includes an annular bearing part 30 configured to bear against an annular seat which is provided on an inner face of the mid shell 2.1 and which surrounds the passage opening 24. Due to the provision of such an annular bearing part 30, even if the pressure inside the compressor casing 2 is high and the welding of the support member 23 on the mid shell 2.1 is poor, the support member 23 is maintained firmly secured on the mid shell 2.1.

The oil level sensor arrangement 14 further includes a mounting flange 31 secured to a proximal end portion of the tubular element 16. The mounting flange 31 has a flat disc shape and extends coaxially with respect to the second tubular part 16.2. The mounting flange 31 includes a first flange face 31.1 and a second flange face 31.2 opposite to the first flange face 31.1. The first flange face 31.1 particularly includes an annular contact surface 32 which abuts against the end face 27 of the cylindrical support portion 26.

Advantageously, the oil level sensor arrangement 14 includes a sealing element 33, such as an annular seal, arranged between the mounting flange 31 and the cylindrical support portion 26, and for example accommodated in an annular groove provided at the end face 27 of the cylindrical support portion 26.

The mounting flange 31 is pressed against the end face 27 of the cylindrical support portion 26 by a threaded fixing member 34, such as a threaded nut element, cooperating with the thread 29 provided on the outer circumferential surface 28 of the cylindrical support portion 26 and with the second flange face 31.2 of the mounting flange 31. According to the embodiment shown on the FIGS. 1 to 5, the threaded fixing member 34 includes a tubular fixing portion having an inner circumferential surface provided with an inner thread configured to cooperate with the thread 29 provided on the outer circumferential surface 28 of the cylindrical support portion 26, and an annular bearing part having an annular bearing surface configured to bear against the second flange face 31.2 of the mounting flange 31 when the threaded fixing member 34 is screwed on the cylindrical support portion 26. Such releasable connection between the mounting flange 31 and the cylindrical support portion 26 may be of a ROTALOCK type.

According to the embodiment shown on the FIGS. 1 to 5, the oil level sensor arrangement 14 includes an angular indexing device 35 configured to define a predetermined relative angular position of the mounting flange 31 with respect to the support member 23 such that the first tubular part 16.1 extends vertically when the mounting flange 31 is secured to the support element 23. Advantageously, the angular indexing device 35 includes a first flat portion 36 provided on the mounting flange 31, and a second flat portion 37 provided on the support member 23 and configured to cooperate with the first cooperating flat portion 36 to define the predetermined relative angular position.

In addition, the oil level sensor arrangement 14 includes an electrical connector 38 formed on the second flange face 31.2 of the mounting flange 31 to allow connection of signal leads and/or power supply leads for communication with the controller 15 of the refrigerant compressor 1. Advantageously, the electrical connector 38 extends coaxially with respect to the second tubular part 16.2.

According to the embodiment shown on the FIGS. 1 to 5, the oil level sensor arrangement 14 is configured to provide a low oil level warning signal to the controller 15 if oil level in the oil sump 13 reaches a predetermined low oil level. Such a predetermined low oil level may be selected to be around half of the nominal oil capacity of the oil sump 13 and above a critical oil level. So, when a low oil level warning signal is outputted by the oil level sensor arrangement 14, the refrigerant compressor 3 may possibly still run safely at least several minutes, and the unit controller can take action to recover the lubricant oil in the oil sump 13 (for example by changing the sequence of running refrigerant compressors in a manifolding).

According to an embodiment of the invention, the controller 15 is configured to:

stop the refrigerant compressor 1 if a low oil level warning signal is provided to the controller 15 and if oil level in the oil sump 13 has not reached a predetermined threshold oil level within a predetermined delay of time after the low oil level warning signal has been provided to the controller 15, where the predetermined threshold oil level is higher than the predetermined low oil level;

allow continuous operation of the refrigerant compressor 1 if a low oil level warning signal is provided to the controller 15 and if oil level in the oil sump 13 reaches the predetermined threshold oil level within the predetermined delay of time after the low oil level warning signal has been provided to the controller 15.

According to another embodiment of the invention, the controller 15 may be configured to stop the refrigerant compressor 1, without any delay of time, if a low oil level warning signal is provided to the controller 15.

As shown on FIG. 5, the oil level sensor arrangement 14 may further comprise at least one additional sensor 39 configured to detect physical properties of the oil sump 13 or the gas inside the compressor casing 2, such as temperature, pressure, moisture content of the lubricant oil, oil viscosity, oil quality, contaminations etc. Knowledge to such properties can be used for improved surveillance and protection of the refrigerant compressor 1. Particularly, the controller 15 may be configured to control operation of the refrigerant compressor 1 based on the physical properties detected by the at least one additional sensor.

For example, the at least one additional sensor 39 may be an oil temperature sensor 39, for example integrated in the tubular element 16, configured to provide signals to the controller 15, and the controller 15 may be configured to further control operation of at least one expansion valve and/or at least one oil heater of a refrigeration system including the refrigerant compressor 1 of the present invention based on the signals provided by the oil temperature sensor, for increased efficiency of said refrigeration system.

For example, when the refrigeration system is running, the controller 15 may determine an oil superheat value instead of a suction gas superheat value and apply this value for the control of an expansion valve. The refrigeration system can run with lower oil superheat and reduced suction gas superheat and so lower bearing losses and larger heat exchange coefficient in evaporator, the refrigeration system efficiency is thus improved. The refrigeration system can run with no suction gas superheat and so with low discharge gas temperature value, and the refrigeration system reliability is thus improved in high pressure ratio conditions. However, the refrigeration system can't run long time with too low oil superheat, so with too low oil viscosity, since this implies compressor bearings wear.

For example, when the refrigeration system is in standstill, the controller 15 may use the oil superheat to control the oil sump heater. If the oil superheat value is below a predetermined level, the controller 15 may activate an oil sump heater to increase oil temperature and prevent refrigerant to condensate in the oil sump 13.

FIG. 6 discloses a refrigerant compressor 1 according to a second embodiment of the invention which differs from the one shown on FIGS. 1 to 5 essentially in that the threaded fixing member 34 includes a threaded rod portion which is configured to extend through a through opening provided on the mounting flange 31 and which is provided with an outer thread configured to cooperate with a threaded bore emerging in the end face 27 of the cylindrical support portion 26, and a bearing head having an annular bearing surface configured to bear against the second flange face 31.2 of the mounting flange 31 when the threaded fixing member 34 is screwed on the cylindrical support portion 26.

FIG. 7 discloses a refrigerant compressor 1 according to a third embodiment of the invention which differs from the one shown on FIGS. 1 to 5 essentially in that the refrigerant compressor 1 further includes a sensor device 41 configured to detect physical properties of the oil sump 13 and/or physical properties of the gas inside the compressor casing 2. The sensor device 41 includes a mounting part 42 secured to an additional passage opening 43 provided on the compressor casing 2, and a sensing part 44 removably secured to the mounting part 42 and at least partially arranged inside the compressor casing 2. Dimensions of the sensing part 44 and the additional passage opening 43 are defined to allow an insertion and a removal of the sensing part 44 into and out of the compressor casing 2 through the additional passage opening 43.

According to the embodiment shown on FIG. 7, the sensing part 44 has a shape similar to the one of the tubular part 16. However, the sensing part 44 may have a straight shape.

A temperature sensor or a pressure sensor may for example be arranged inside the sensing part 44. Such a temperature sensor may be configured to detect the temperature of the lubricant oil contained in the oil sump 13.

FIG. 8 discloses a refrigerant compressor 1 according to a fourth embodiment of the invention which differs from the one shown on FIGS. 1 to 5 essentially in that the oil level sensor arrangement 14 comprises a plurality of tubular elements 16 secured to the compressor casing 2 and a plurality of floating elements 17 each surrounding a respective tubular element 16 and each being movably mounted with respect to the respective tubular element 16. According to such an embodiment, the compressor casing 2 comprises a plurality of passage openings 24 each associated to a respective floating element 17 and a respective tubular element 16. According to such an embodiment of the invention, the several floating elements may have different minimal and/or maximal detection positions.

Of course, the invention is not restricted to the embodiments described above by way of non-limiting examples, but on the contrary it encompasses all embodiments thereof.

The invention claimed is:

1. A refrigerant compressor including:
a compressor casing,
an oil sump arranged in a lower part of the compressor casing, and
an oil level sensor arrangement configured to detect an oil level in the oil sump, the oil level sensor arrangement including a tubular element secured to the compressor casing and at least partially arranged inside the compressor casing, and a floating element surrounding the tubular element and being movably mounted with respect to the tubular element, the floating element being configured to float on lubricant oil contained in the oil sump,
wherein the compressor casing includes a passage opening, and dimensions of the tubular element, the floating element and the passage opening are defined to allow an insertion and a removal of the tubular element and the floating element into and out of the compressor casing through the passage opening.

2. The refrigerant compressor according to claim 1, wherein the floating element includes a floating body and a magnet element secured to the floating body.

3. The refrigerant compressor according to claim 2, wherein the floating body is made by a material having a density lower than a density of the lubricant oil contained in the oil sump.

4. The refrigerant compressor according to claim 2, wherein the magnet element is at least partially arranged within the floating body.

5. The refrigerant compressor according to claim 2, wherein the oil level sensor arrangement includes a magnetically sensitive sensor arranged inside the tubular element and configured to be activated by a magnetic field provided by the magnet element.

6. The refrigerant compressor according to claim 1, wherein the passage opening is provided on a mid shell or on a baseplate of the compressor casing.

7. The refrigerant compressor according to claim 1, wherein the oil level sensor arrangement further includes a support member secured to the passage opening, the support member including an axial through passage and being configured to allow insertion and removal of the tubular element and the floating element through the axial through passage, the tubular element being attached to the support member.

8. The refrigerant compressor according to claim 7, wherein the support member includes a cylindrical support portion at least partially arranged outside the compressor casing and projecting in a radial direction away from the compressor casing.

9. The refrigerant compressor according to claim 8, wherein the oil level sensor arrangement includes a mounting flange secured to a proximal end portion of the tubular element, the mounting flange including a first flange face and a second flange face opposite to the first flange face, the first flange face including an annular contact surface which abuts against an end face of the cylindrical support portion.

10. The refrigerant compressor according to claim 9, wherein the oil level sensor arrangement includes an electrical connector formed on the second flange face of the mounting flange and configured to allow connection of signal leads and/or power supply leads for communication with a controller of the refrigerant compressor or of a refrigeration system comprising the refrigerant compressor.

11. The refrigerant compressor according to claim 9, wherein the mounting flange is pressed against the end face of the cylindrical support portion by a threaded fixing member cooperating with a thread provided on the cylindrical support portion and with the second flange face of the mounting flange.

12. The refrigerant compressor according to claim 9, wherein the oil level sensor arrangement includes an angular indexing device configured to define a predetermined relative angular position of the mounting flange with respect to the support member.

13. The refrigerant compressor according to claim 12, wherein the angular indexing device includes a first flat portion provided on the mounting flange and a second flat portion provided on the support member and configured to cooperate with the first cooperating flat portion to define and maintain the predetermined relative angular position.

14. The refrigerant compressor according to claim 1, wherein the tubular element includes a distal end which is immersed in the oil sump and which is closed.

15. The refrigerant compressor according to claim 1, wherein the tubular element comprises a first tubular part having a first longitudinal axis and a second tubular part having a second longitudinal axis, the first and second longitudinal axes of the first and second tubular parts being arranged at an angle of about 90 degrees.

16. The refrigerant compressor according to claim 15, wherein the first tubular part is arranged vertically and is at least partly immersed in the oil sump, the first tubular part being surrounded by the floating element.

17. The refrigerant compressor according to claim 15, wherein the second tubular part is arranged horizontally.

18. The refrigerant compressor according to claim 1, wherein the oil level sensor arrangement further comprise at least one additional sensor configured to detect physical properties of the oil sump and/or physical properties of the gas inside the compressor casing.

19. A refrigeration system including the refrigerant compressor according to claim 1, and a system controller configured to control operation of the refrigerant compressor based on oil level detected by the oil level sensor arrangement of the refrigerant compressor.

* * * * *